US010669432B2

(12) United States Patent
Takeda et al.

(10) Patent No.: US 10,669,432 B2
(45) Date of Patent: Jun. 2, 2020

(54) ELECTRICAL STEEL SHEET AND METHOD OF MANUFACTURING THE SAME

(75) Inventors: Kazutoshi Takeda, Tokyo (JP); Kenji Kosuge, Tokyo (JP); Tatsuya Takase, Tokyo (JP); Koji Muneda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 627 days.

(21) Appl. No.: 13/881,804

(22) PCT Filed: Oct. 25, 2011

(86) PCT No.: PCT/JP2011/074590
§ 371 (c)(1),
(2), (4) Date: Apr. 26, 2013

(87) PCT Pub. No.: WO2012/057168
PCT Pub. Date: May 3, 2012

(65) Prior Publication Data
US 2013/0209789 A1    Aug. 15, 2013

(30) Foreign Application Priority Data

Oct. 29, 2010    (JP) ................................. 2010-244030

(51) Int. Cl.
| | |
|---|---|
| *C09D 5/08* | (2006.01) |
| *C22C 38/34* | (2006.01) |
| *C22C 38/00* | (2006.01) |
| *C21D 9/46* | (2006.01) |
| *H01F 1/18* | (2006.01) |
| *C22C 38/06* | (2006.01) |
| *C22C 38/04* | (2006.01) |
| *C22C 38/02* | (2006.01) |
| *C21D 8/12* | (2006.01) |
| *C23C 22/74* | (2006.01) |

(52) U.S. Cl.
CPC ............... *C09D 5/08* (2013.01); *C09D 5/084* (2013.01); *C21D 8/12* (2013.01); *C21D 9/46* (2013.01); *C22C 38/00* (2013.01); *C22C 38/02* (2013.01); *C22C 38/04* (2013.01); *C22C 38/06* (2013.01); *C22C 38/34* (2013.01); *C23C 22/74* (2013.01); *H01F 1/18* (2013.01); *Y10T 428/254* (2015.01)

(58) Field of Classification Search
None
See application file for complete search history.

(56) References Cited

U.S. PATENT DOCUMENTS

| | | | |
|---|---|---|---|
| 5,955,201 A | 9/1999 | Loudermilk et al. | |
| 6,153,303 A * | 11/2000 | Namura | C08L 27/18 427/385.5 |
| 6,159,534 A | 12/2000 | Takeda | |
| 6,383,650 B1 | 5/2002 | Takeda | |
| 6,638,633 B1 | 10/2003 | Komori et al. | |
| 6,686,432 B2 * | 2/2004 | Coca | C08F 8/00 526/264 |
| 7,226,658 B2 | 6/2007 | Sashl et al. | |
| 2003/0175524 A1 | 9/2003 | Sashi et al. | |
| 2006/0014092 A1 | 1/2006 | Nukada et al. | |
| 2006/0074179 A1 * | 4/2006 | Coca | C08F 8/00 524/544 |
| 2006/0178264 A1 * | 8/2006 | Kameshima | B32B 27/10 502/439 |
| 2007/0272117 A1 * | 11/2007 | Staffel | C01B 25/36 106/14.12 |
| 2008/0107866 A1 * | 5/2008 | Iwasa | B32B 15/08 428/141 |
| 2011/0212335 A1 * | 9/2011 | Takeda | C22C 38/02 428/458 |
| 2013/0115443 A1 | 5/2013 | Takeda et al. | |

FOREIGN PATENT DOCUMENTS

| | | |
|---|---|---|
| CN | 1219559 A | 6/1999 |
| CN | 1227860 A | 9/1999 |
| CN | 1257136 A | 6/2000 |
| CN | 1463301 A | 12/2003 |
| EP | 1 291 451 A1 | 3/2003 |
| JP | 49-19078 | 5/1974 |
| JP | 50-15016 | 6/1975 |
| JP | 60-38068 A | 2/1985 |

(Continued)

OTHER PUBLICATIONS

Forms PCT/IB/338, PCT/IB/373, and PCT/ISA/237, dated May 23, 2013, for International Application No. PCT/JP2011/074590.
International Search Report for PCT/JP2011/074590 dated Nov. 22, 2011.
Chinese Office Action and Search Report, dated Jun. 6, 2014, for Chinese Application No. 201180052130.4.
Korea Office Action, dated Jul. 1, 2014, for Korea Application No. 10-2013-7010262.
Extended European Search Report dated Dec. 22, 2014, issued in corresponding European Patent Application No. 11836301.9.

*Primary Examiner* — Callie E Shosho
*Assistant Examiner* — Patrick N English
(74) *Attorney, Agent, or Firm* — Birch, Stewart, Kolasch & Birch, LLP

(57) ABSTRACT

An insulating coating film obtained by mixing 0.5 parts by mass to 10 parts by mass of a copolymer of a fluoroolefin and an ethylenically unsaturated compound when converted into a solid content with 100 parts by mass in solid content of a mixture composed of a metal phosphate and a specific organic resin or a mixture composed of colloidal silica and a specific organic resin is designed to be provided on a surface of an electrical steel sheet, and in this manner, it is possible to obtain an electrical steel sheet having good corrosion resistance under a wet environment and having good properties related to the insulating coating film such as a space factor and adhesiveness.

1 Claim, No Drawings

(56) References Cited

FOREIGN PATENT DOCUMENTS

| | | |
|---|---:|---:|
| JP | 3-36284 A | 2/1991 |
| JP | 5-98207 A | 4/1993 |
| JP | 6-330338 A | 11/1994 |
| JP | 7-41913 A | 2/1995 |
| JP | 7-278834 A | 10/1995 |
| JP | 7-286283 A | 10/1995 |
| JP | 9-323066 A | 12/1997 |
| JP | 2000-129455 A | 5/2000 |
| JP | 2002-309379 A | 10/2002 |
| WO | WO 2006/049935 A1 | 5/2006 |
| WO | WO 2012/011442 A1 | 1/2012 |

* cited by examiner

ELECTRICAL STEEL SHEET AND METHOD OF MANUFACTURING THE SAME

TECHNICAL FIELD

The present invention relates to an electrical steel sheet used as an iron core material of an electric apparatus, for example, and a method of manufacturing the same, and relates to an electrical steel sheet having an insulating coating film having good insulation performance, particularly having good corrosion resistance under a wet environment and adhesiveness and containing no chromic acid, and a method of manufacturing the same. This application is based upon and claims the benefit of priority of the prior Japanese Patent Application No. 2010-244030, filed on Oct. 29, 2010, the entire contents of which are incorporated herein by reference.

BACKGROUND ART

When a motor or a transformer is manufactured, first, a hoop-shaped electrical steel sheet is punched into a predetermined shape and hoop-shaped electrical steel sheets are laminated and fixed to thereby manufacture an iron core. Then, a copper wire is wound around teeth or/and the like to then be immersed in a varnish and has powdered paint sprayed thereon. Thereafter, the iron core has terminals for connecting the copper wire, flanges, bearings, and so on attached thereto and is fixed to a case.

In such a manufacturing process of the iron core, a facility restriction of a press or the like is large, and thus there is often a case that a lot of time is taken for the process in which the electrical steel sheet is punched into a predetermined shape.

Thus, for efficiently performing the punching process, the hoop-shaped electrical steel sheet is well prepared beforehand and the process of winding the copper wire after the punching is performed collectively, resulting in that an increase in efficiency is achieved.

In the case when the hoop-shaped electrical steel sheets are stored, it is general to use a depository for preventing rusting, but there is often a case that the hoop-shaped electrical steel sheets are left outside the depository for efficiently performing the punching process, and in this case, it is necessary to pay attention to rusting particularly.

Further, in recent years, a process base of the iron core is shifted to China and Southeast Asia, and thereby a cost reduction is generally performed. In such countries, there is often a case that factories are established under a wet environment rather than in Japan, and corrosion resistance under a wet environment is needed rather than in Japan.

Normally, on the surface of the electrical steel sheet used for the iron core of an electric apparatus, an insulating coating film for reducing eddy current loss is applied, and the insulating coating film is required to have coating film properties such as corrosion resistance, adhesiveness, a punching property, and heat resistance in addition to insulation performance.

In this insulating coating film, a mixture having an inorganic acid salt such as chromate or phosphate and an organic resin as its main component is generally contained. In recent years, due to the environmental concern, an insulating coating film containing no chromium is required.

With the progress of an increase in efficiency of the manufacturing process of the iron core of an electric apparatus, the insulating coating film of the electrical steel sheet is required to have more corrosion resistance than ever, and the improvement of the corrosion resistance under a wet environment in particular is required.

That is, it is sufficient for an insulating coating film for a conventional electrical steel sheet to have corrosion resistance enough to be able to suppress rusting in a depository before the punching process, but in recent years, corrosion resistance enough to prevent rusting even under the wet environment is required.

Further, it is possible to improve the corrosion resistance by applying the insulating coating film thickly, but there are problems that a space factor decreases and adhesiveness decreases.

Further, an electrical steel sheet having a coating material having a fluorocarbon resin as its main component applied on a surface thereof as the insulating coating film has problems that cost is increased and a varnish after the punching does not adhere to the electrical steel sheet.

CITATION LIST

Patent Literature

Patent Literature 1: Japanese Examined Patent Application Publication No. 50-15016
Patent Literature 2: Japanese Laid-open Patent Publication No. 03-36284
Patent Literature 3: Japanese Examined Patent Application Publication No. 49-19078
Patent Literature 4: Japanese Laid-open Patent Publication No. 06-330338
Patent Literature 5: Japanese Laid-open Patent Publication No. 09-323066
Patent Literature 6: Japanese Laid-open Patent Publication No. 2002-309379
Patent Literature 7: Japanese Laid-open Patent Publication No. 05-98207
Patent Literature 8: Japanese Laid-open Patent Publication No. 07-41913

SUMMARY OF INVENTION

Technical Problem

Thus, the present invention has been made in consideration of the above-described problems, and an object of the present invention is to provide an electrical steel sheet having more excellent corrosion resistance under a wet environment and having good coating film properties, and a method of manufacturing the same.

Solution to Problem

The gist of the present invention is as follows.
(1) An Electrical Steel Sheet Having a Surface Thereof Coated with an Insulating Coating Film Obtained by Mixing 100 parts by mass of a mixture composed of 100 parts by mass of a metal phosphate and 1 part by mass to 50 parts by mass of an organic resin made of a mixture or copolymer of one type or two or more types selected from a group consisting of an acryl-based resin, an epoxy-based resin, and a polyester-based resin that have an average particle size of 0.05 μm to 0.50 μm and 0.5 parts by mass to 10 parts by mass of a copolymer of a fluoroolefin and an ethylenically unsaturated compound as a solid content.

(2) An Electrical Steel Sheet Having a Surface Thereof Coated With an Insulating Coating Film Obtained by Mixing 100 parts by mass of a mixture composed of 100 parts by mass of colloidal silica and 40 parts by mass to 400 parts by mass of an organic resin made of a mixture or copolymer of one type or two or more types selected from a group consisting of an acryl-based resin, an epoxy-based resin, and a polyester-based resin that have an average particle size of 0.05 μm to 0.50 μm and 0.5 parts by mass to 10 parts by mass of a copolymer of a fluoroolefin and an ethylenically unsaturated compound as a solid content.

(3) A Method of Manufacturing an Electrical Steel Sheet Includes:

mixing 1 part by mass to 50 parts by mass in solid content of an organic resin made of a mixture or copolymer of one type or two or more types selected from a group consisting of an acryl-based resin, an epoxy-based resin, and a polyester-based resin that have an average particle size of 0.05 μm to 0.50 μm with 100 parts by mass of a metal phosphate;

making a treatment solution obtained by mixing 0.5 parts by mass to 10 parts by mass of a copolymer of a fluoroolefin and an ethylenically unsaturated compound when converted into a solid content with 100 parts by mass in solid content of a mixture of the metal phosphate and the organic resin;

applying the made treatment solution on a surface of the steel sheet; and baking and drying the steel sheet having had the treatment solution applied thereon at an ultimate temperature of 200° C. to 380° C. for 15 seconds and 60 seconds.

(4) A Method of Manufacturing an Electrical Steel Sheet Includes:

mixing 40 parts by mass to 400 parts by mass in solid content of an organic resin made of a mixture or copolymer of one type or two or more types selected from a group consisting of an acryl-based resin, an epoxy-based resin, and a polyester-based resin that have an average particle size of 0.05 μm to 0.50 μm with 100 parts by mass of colloidal silica;

making a treatment solution obtained by mixing 0.5 parts by mass to 10 parts by mass of a copolymer of a fluoroolefin and an ethylenically unsaturated compound when converted into a solid content with 100 parts by mass in solid content of a mixture of the colloidal silica and the organic resin;

applying the made treatment solution on a surface of the steel sheet; and baking and drying the steel sheet having had the treatment solution applied thereon at an ultimate temperature of 200° C. to 380° C. for 15 seconds and 60 seconds.

Advantageous Effects of Invention

According to the present invention, it is possible to obtain an electrical steel sheet coated with an insulating coating film having good corrosion resistance under a wet environment and maintaining coating film properties necessary as an electrical steel sheet such as adhesiveness, a space factor, and a punching property.

DESCRIPTION OF EMBODIMENTS

Hereinafter, a concrete embodiment implementing the present invention will be explained.

First, as for a steel sheet used in this embodiment, a steel sheet for a non-oriented electrical steel sheet containing Si: 0.1 mass % or more and Al: 0.05 mass % or more is suitable. As for Si, as the content is increased, electrical resistance becomes large and a magnetic property improves, but at the same time, brittleness increases and a rolling property decreases, and thus less than 4.0 mass % is favorable. Similarly, as the content of Al is increased, the magnetic property improves, but the rolling property decreases, and thus less than 3.0 mass % is favorable. In the steel sheet used in this embodiment, in addition to Si and Al, Mn, Sn, Cr, and P may also be contained to fall within a range of 0.01 mass % to 1.0 mass %. Further, other representative elements such as S, N, and C may also be contained, and the contents of these elements are preferably less than 100 ppm, and are further preferably less than 20 ppm.

In this embodiment, a slab is heated to 1000° C. to 1250° C. and is hot rolled to be wound in a coil shape, and is annealed in a range of 800° C. to 1050° C. in a state of a hot-rolled sheet according to need, and then is cold rolled to be 0.15 mm to 0.5 mm and further is annealed at 750° C. to 1100° C., and thereby the steel sheet having the above-described components is manufactured.

Further, on the surface of the steel sheet where an insulating coating film is formed, before applying a later-described treatment solution, arbitrary pretreatments such as a degreasing treatment by alkali or the like and a pickling treatment by hydrochloric acid, sulfuric acid, phosphoric acid, or the like may be performed, or a surface state obtained after finish annealing may also be kept without the pretreatments being performed thereon.

In the steel sheet used in this embodiment, it is preferred to finish surface roughness so that centerline average roughness (Ra) in a rolling direction and in a direction perpendicular to the rolling direction may become 1.0 μm or less and may further suitably become not less than 0.1 μm nor more than 0.5 μm.

Next, the insulating coating film to be formed on the surface of the steel sheet will be explained. The insulating coating film has a metal phosphate or colloidal silica as its main component.

Here, the metal phosphate is one to be a solid content when an aqueous solution having a phosphoric acid and metal ions as its main component is dried, and types of the phosphoric acid are not limited in particular, but an orthophosphoric acid, a metaphosphoric acid, a polyphosphoric acid, and the like are favorable.

Further, as types of the metal ions, ions such as Li, Al, Mg, Ca, Sr, Ti, Ni, Mn, and Co are favorable, and in particular, Al, Ca, Mn, and Ni ions are favorable. When a metal phosphate solution is prepared, it is preferably prepared by mixing, for example, an oxide of metal ion, a carbonate, or a hydroxide in an orthophosphoric acid.

The metal phosphate may be used solely or two or more types may also be mixed and used. Further, the metal phosphate only is also acceptable, or one to which an additive such as phosphonic acid or boric acid is added may also be used.

On the other hand, as for the colloidal silica, one having an average particle size of 5 nm to 40 nm and having an Na content of 0.5 mass % or less is suitable, and more suitably, the Na content is 0.01 mass % to 0.3 mass %.

The average particle size of the colloidal silica used in this embodiment is a number average particle size and is measured by a nitrogen adsorption method.

The metal phosphate or colloidal silica, and an organic resin made of a mixture or copolymer of one type or two or more types selected from a group consisting of an acryl-based resin, an epoxy-based resin, and a polyester-based resin that have an average particle size of 0.05 μm to 0.50 μm, which will be explained later, are thinly formed on the surface of the steel sheet as the insulating coating film. Note that the film thickness of the insulating coating film is preferably 0.3 µm to 3.0 µm or so, and is more suitably 0.5 µm to 1.5 µm.

For the acryl-based resin, the epoxy-based resin, and the polyester-based resin used in this embodiment, an organic resin emulsion commercially available in general may be used. As for suitable ones, with regard to the acryl-based resin, there can be cited methyl acrylate, ethyl acrylate, n-butyl acrylate, 1-butyl acrylate, n-octyl acrylate, i-octyl acrylate, 2-ethylhexyl acrylate, n-nonyl acrylate, n-decyl acrylate, n-dodecyl acrylate, and the like as a normal monomer. Additionally, as a monomer having a functional group, ones obtained by copolymerizing acrylic acid, methacrylic acid, maleic acid, maleic anhydride, fumaric acid, crotonic acid, and itaconic acid are suitable. Further, as a monomer having a hydroxyl group, ones obtained by copolymerizing 2-hydroxylethyl (metha) acrylate, 2-hydroxylpropyl (metha) acrylate, 3-hydroxylbutyl (metha) acrylate, 2-hydroxylethyl (metha) allyl ether, and the like are suitable.

In the case of the epoxy-based resin, for example, there can be cited one obtained by making a carboxylic anhydride react with an amine-modified epoxy resin, and concretely, bisphenol A-diglycidyl ether, a ring-opening adduct of caprolactone of bisphenol A-diglycidyl ether, bisphenol F-diglycidyl ether, bisphenol S-diglycidyl ether, novolac glycidyl ether, dimer acid glycidyl ether, and the like are suitable. Here, as the amine to be modified, isopropanolamine, monopropanolamine, monobutanolamine, monoethanolamine, diethylenetriamine, ethylenediamine, butalamine, propylamine, isophoronediamine, tetrahydrofurfurylamine, xylenediamine, hexylamine, nonylamine, triethylenetetramine, tetramethylenepentamine, diaminodiphenylsulfone, and the like are suitable. Further, as the carboxylic anhydride, ones obtained by reaction with succinic anhydride, itaconic anhydride, maleic anhydride, citraconic anhydride, phthalic anhydride, trimellitic anhydride, and the like are suitable.

As examples of the polyester-based resin, ones obtained by making dicarboxylic acid such as terephthalic acid, isophthalic acid, orthophthalic acid, naphthalene dicarboxylic acid, biphenyl dicarboxylic acid, succinic acid, adipic acid, sebacic acid, fumaric acid, maleic acid, maleic anhydride, itaconic acid, or citraconic acid, and glycol such as ethylene glycol, 1,2-propylene glycol, 1,3-propanediol, 1,4-butanediol, 1,5-pentanediol, neopentyldiol 1,6-hexanediol, triethylene glycol, dipropylene glycol, or polyethylene glycol react with each other, are suitable. Moreover, acrylic acid, methacrylic acid, maleic acid, fumaric acid, itaconic acid, citraconic acid, methacrylic acid anhydride, or the like may also be graft polymerized with these polyester-based resins.

The above-described organic resin emulsion may be a mixture of one type or two or more types selected from the group consisting of the above-described acryl-based resin, epoxy-based resin, and polyester-based resin, or may also be a copolymer of these resins. Further, an average particle size of the above-described organic resin emulsion falls within a range of 0.05 µm to 0.50 µm. Incidentally, the average particle size of the organic resin emulsion is a number average particle size and is measured by a laser diffractometry. This is because when the average particle size is 0.05 µm or less, the organic resin emulsion aggregates easily in the treatment solution and the evenness of the insulating coating film is likely to decrease, and when the average particle size is larger than 0.50 µm, the stability of the solution is likely to decrease. If the stability of the solution deteriorates, there is sometimes a case that aggregates are generated in the solution and pipes and pumps are clogged when the solution is disposed of. Further, when the aggregates enter the insulating coating film, a defect is likely to occur in the insulating coating film. The average particle size of the above-described organic resin emulsion more suitably falls within a range of 0.1 µm to 0.3 µm.

As for a mixing ratio of the metal phosphate and the organic resin made of the mixture or copolymer of one type or two or more types selected from the group consisting of the previously-described acryl-based resin, epoxy-based resin, and polyester-based resin, the above-described organic resin is set to 1 part by mass to 50 parts by mass relative to 100 parts by mass of the metal phosphate. This is because when the mixing ratio of the above-described organic resin is less than 1 part by mass, the concentration of the resin is too small and thus aggregates are generated easily and the stability of the solution deteriorates, and when the mixing ratio is larger than 50 parts by mass, there is a possibility that the insulating coating film deteriorates in heat resistance.

Further, as for a mixing ratio of the colloidal silica and the above-described organic resin, the above-described organic resin is set to 40 parts by mass to 400 parts by mass relative to 100 parts by mass of the colloidal silica. This is because when the mixing ratio of the above-described organic resin is less than 40 parts by mass, a film forming property is poor and the insulating coating film is likely to generate powder, and when the mixing ratio is larger than 400 parts by mass, there is a possibility that the insulating coating film deteriorates in heat resistance.

In this embodiment, other than the above-explained components, a copolymer of a fluoroolefin and an ethylenically unsaturated compound is contained in the insulating coating film.

The copolymer of the fluoroolefin and the ethylenically unsaturated compound to be used in this embodiment is one obtained by copolymerizing a fluoroolefin with a monomer, an oligomer, or a low-molecular polymer having a radical polymerizable unsaturated group. Here, the fluoroolefin has an unsaturated hydrocarbon structure in which fluorine atoms are directly bonded to a carbon skeleton of olefin, and is a compound in which at least one of groups bonded to carbon forming an unsaturated bond is a fluorine atom. Concretely, there can be cited tetrafluoroethylene, trifluoroethylene, hexafluoropropylene, vinylidene fluoride, vinyl fluoride, trichlorofluoroethylene, and the like. In this embodiment, one type or two or more types of them can be used.

Further, the ethylenically unsaturated compound has a vinyl group in its structure, can form a copolymer with a fluoroolefin, is generally called vinyl ether, and is a monomer, an oligomer, or a low-molecular polymer having various functional groups. As an example of the monomer, for example, styrene, vinyl acetate, polypropylene glycol acrylate, methoxy polyethylene methacrylate, vinyl alkyl ether, vinyl alkylene ether, isoprene, acrylonitrile, and the like are suitable. In addition to these monomers, oligomers or low-molecular polymers having a similar structure are also favorable. In this embodiment, one obtained by introducing various functional groups into such a monomer, oligomer, or low-molecular polymer may also be used. As an example of such a functional group, an alkyl group, a hydroxyl substituted alkylene group, a phenyl group, a benzyl group, a cyclic aliphatic group, and an acetyl group are favorable, or crosslinkable reaction groups such as a carboxyl group, a hydroxyl group, an epoxy group, and an amino group are also favorable. Examples of the alkyl group and the alkylene group are a straight-chain alkyl group with 1 to 10 chained carbons (C), and an example of the alkylene group is a hydroxyl straight-chain alkylene group with 1 to 14 chained C and a hydroxyl group at its terminal, or the like. Incidentally, it is set that as the functional groups in this embodiment, a fluoro group and other functional groups having fluorine atoms are not included.

Further, as the ethylenically unsaturated compound, it is also possible to use ones obtained by making the monomer, the oligomer, or the low-molecular polymer having these functional groups react with glycidyl methacrylate, hydroxymethyl acrylate, N,Ndimethylaminoethyl methacrylate, diacetone acrylamide, butadiene, chloroprene, or the like.

In the one obtained by copolymerizing the fluoroolefin and the ethylenically unsaturated compound, a portion containing fluorine atoms and a portion containing no fluorine atoms exist. Thus, by the portion containing fluorine atoms, the heat resistance and water resistance are maintained, and at the same time, by functional groups introduced into the portion containing no fluorine atoms, the adhesiveness with a base material and flexibility are maintained. Further, it is designed to prevent a fluoro group and functional groups having fluorine atoms from being contained in the portion of the ethylenically unsaturated compound, thereby making it possible to obtain the insulating coating film having improved dispersibility and having excellent evenness.

These copolymers of the fluoroolefin and the ethylenically unsaturated compound may be used solely, or a mixture of two or more types of ones having different functional groups or ones having different molecular weights is also favorable.

A particle size of the copolymer of the fluoroolefin and the ethylenically unsaturated compound is not defined in particular, but suitably falls within a range of 0.05 µm to 0.50 µm, and more suitably falls within a range of 0.05 µm to 0.20 µm. When the particle size is less than 0.05 µm, the copolymer aggregates easily in the solution and the stability of the solution is likely to deteriorate. As described previously, if the stability of the solution deteriorates, there is sometimes a case that aggregates are generated in the solution and pipes and pumps are clogged when the solution is disposed of. Further, when the aggregates enter the insulating coating film, a defect is likely to occur in the insulating coating film. When the particle size is larger than 0.50 µm, the insulating coating film is easily peeled off when being formed and is likely to generate powder. Further, when the particle size is 0.20 µm or less, a beautiful appearance can be obtained easily.

Next, a mixing ratio of the copolymer of the fluoroolefin and the ethylenically unsaturated compound to the mixture of the metal phosphate and the previously-described organic resin is set to 0.5 parts by mass to 10 parts by mass when converted into a solid content relative to 100 parts by mass in solid content of the above-described mixture. This is because when the mixing ratio of the copolymer is less than 0.5 parts by mass, there is a risk that an effect of improving the corrosion resistance does not appear sufficiently, and when the mixing ratio is larger than 10 parts by mass, the stability of the solution deteriorates and workability is likely to decrease.

Further, a mixing ratio of the copolymer of the fluoroolefin and the ethylenically unsaturated compound to the mixture of the colloidal silica and the previously-described organic resin is also set to 0.5 parts by mass to 10 parts by mass when converted into a solid content relative to 100 parts by mass in solid content of the above-described mixture. This is because when the mixing ratio of the copolymer is less than 0.5 parts by mass, the effect of improving the corrosion resistance does not appear sufficiently, and when the mixing ratio is larger than 10 parts by mass, the stability of the solution deteriorates.

Further, in the insulating coating film, components other than the mixture of the metal phosphate or the colloidal silica and the previously-described organic resin, and the copolymer of the fluoroolefin and the ethylenically unsaturated compound may also be contained. For example, an inorganic compound such as carbonate, hydroxide, oxide, titanate, or tungstate, or an organic low-molecular compound such as polyol, cellosolve, carboxylic acids, ethers, or esters may also be added as an additive.

Next, in the case when the treatment solution containing the above-explained components is applied on the surface of the electrical steel sheet, the application method is not limited in particular, and a roll coater method may be used, or an application method such as a spray method or a dip method may also be used.

Further, in the case when a heating method of drying and baking the treatment solution is used, an ordinary radiation furnace or air heating furnace can be used, or an induction heating method, a high-frequency heating method, or the like may also be used.

As drying conditions, for example, the range of 200° C. to 380° C. and a baking time from 15 seconds to 60 seconds are appropriate. In the case of the insulating coating film containing the metal phosphate, the range of 260° C. to 330° C. is more suitable. On the other hand, in the case of the insulating coating film containing the colloidal silica, the range of 200° C. to 300° C. is appropriate, and the range of 240° C. to 280° C. is more suitable.

Further, an additive such as a surface-active agent may also be added to the above-described treatment solution. As the surface-active agent, an aliphatic polyoxyalkylene ether surface-active agent is appropriate, and additionally, a brightener, an antiseptic, an antioxidant, and/or the like may also be added.

In the insulating coating film composed of the above-described copolymer of the fluoroolefin and the ethylenically unsaturated compound and the mixture of the metal phosphate or colloidal silica and the specific organic resin, the copolymer is dispersed in the insulating coating film. The dispersed copolymer of the fluoroolefin and the ethylenically unsaturated compound is concentrated in the vicinity of a surface layer of the insulating coating film and surface tension of the insulating coating film is substantially optimized. As a result, it is conceivable that the adhesiveness is maintained and the corrosion resistance under the wet environment is improved.

EXAMPLE

Next, experiments performed by the present inventors will be explained. Conditions and so on in these experiments are examples employed to confirm the applicability and effects of the present invention, and the present invention is not limited to these examples.

First, a steel sheet containing Si: 2.0 mass %, Al: 0.3 mass %, and Mn: 0.3 mass %, having a sheet thickness of 0.35 mm, and having surface roughness in Ra (centerline average roughness) of 0.44 µm was prepared. Incidentally, the surface roughness of the steel sheet was measured by using a commercially available surface roughness measuring device based on a JIS method (JIS 20601).

Next, mixed solutions No. 1 to No. 15 shown in Table 1 below were made.

TABLE 1

| No. | BINDER SOLUTION NAME | ORGANIC RESIN | PART BY MASS OF RESIN | OTHER ADDITIVES |
|---|---|---|---|---|
| 1 | ALUMINUM PHOSPHATE | ACRYL-BASED RESIN 1 | 20 | |
| 2 | NICKEL PHOSPHATE | ACRYL-BASED RESIN 1 | 15 | |
| 3 | MANGANESE PHOSPHATE | EPOXY-BASED RESIN 1 | 8 | PHOSPHONIC ACID 1.5 |
| 4 | ALUMINUM PHOSPHATE | POLYESTER-BASED RESIN | 40 | |
| 5 | COLLOIDAL SILICA | ACRYL-BASED RESIN 1 | 100 | |
| 6 | COLLOIDAL SILICA | EPOXY-BASED RESIN 1 | 80 | |
| 7 | ALUMINUM PHOSPHATE | ACRYL-BASED RESIN 2 | 30 | |
| 8 | ALUMINUM PHOSPHATE | EPOXY-BASED RESIN 2 | 30 | |
| 9 | ALUMINUM PHOSPHATE | ACRYL-BASED RESIN 1 | 0.5 | |
| 10 | CALCIUM PHOSPHATE | POLYESTER-BASED RESIN | 60 | |
| 11 | ALUMINUM PHOSPHATE | AQUEOUS POLYURETHANE | 30 | |
| 12 | COLLOIDAL SILICA | EPOXY-BASED RESIN 2 | 30 | |
| 13 | COLLOIDAL SILICA | ACRYL-BASED RESIN 1 | 30 | |
| 14 | COLLOIDAL SILICA | ACRYL-BASED RESIN 1 | 450 | |
| 15 | MAGNESIUM CHROMATE | ACRYL-BASED RESIN 1 | 30 | |

As the metal phosphate, an orthophosphoric acid and a metal hydroxide such as $Al(OH)_3$, an oxide, or a carbonate were mixed and stirred to thereby prepare a metal phosphate treatment solution, which was set to an aqueous solution of 40 mass %. Incidentally, as a reference example, a magnesium chromate aqueous solution of 40 mass % was also prepared.

For the colloidal silica, commercially available one with a concentration of 30 mass % having an average particle size of 15 nm and having its surface modified by aluminum was used.

Further, with regard to the organic resin, six types of organic resins shown below were each set as an emulsion solution with a concentration of 30 mass %. Further, proper amounts of a viscosity modifier and a surface-active agent were added to make the mixed solutions shown in Table 1.

(1) Acryl-based resin 1: an acryl-based resin obtained by copolymerizing 30 mass % of methyl methacrylate, 10 mass % of 2-hydroxyethyl methacrylate, 30 mass % of n-butyl acrylate, 10 mass % of styrene monomer, and 20 mass % of isobutyl acrylate (2) Acryl-based resin 2: an acryl-based resin obtained by copolymerizing 45 mass % of methyl acrylate, 30 mass % of styrene monomer, 20 mass % of isobutyl acrylate, and 15 mass % of maleic acid (3) Epoxy-based resin 1: a carboxyl-group modified epoxy-based resin obtained by modifying bisphenol A by triethanolamine and then making succinic anhydride react therewith (4) Epoxy-based resin 2: an epoxy-based resin obtained by mixing an ethylene propylene block polymer with a phenol-novolac epoxy resin and adding a nonylphenyl ether ethylene oxide thereto, thereby making it a self-emulsifying type (5) Polyester-based resin: a polyester-based resin containing a carboxyl group obtained by copolymerizing 35 mass % of dimethyl terephthalate and 35 mass % of neopentyl glycol and then graft polymerizing 15 mass % of fumaric acid and 15 mass % of trimellitic anhydride (6) Aqueous polyurethane: aqueous polyurethane synthesized from hexamethylene diisocyanate and polyethylene glycol by an already-known method Incidentally, average particle sizes of the acryl-based resin 1 and the acryl-based resin 2 were 0.25 μm and 0.64 μm respectively. Further, average particle sizes of the epoxy-based resin 1 and the epoxy-based resin 2 were 0.33 μm and 0.76 μm respectively. Further, an average particle size of the polyester-based resin was 0.35 μm, and an average particle size of the aqueous polyurethane was 0.12 μm. Note that parts by mass of resins shown in Table 1 are values converted into a solid content.

Further, to the mixed solution No. 3, as an additive, 1.5 parts by mass of phosphonic acid was added relative to 100 parts by mass of manganese phosphate.

Next, treatment solutions obtained by adding predetermined amounts of copolymers of a fluoroolefin and an ethylenically unsaturated compound or fluorocarbon resins shown in Table 2 below to these mixed solutions shown in Table 1, and treatment solutions obtained by adding nothing to the mixed solutions shown in Table 1 were made. Note that the fluorocarbon resin added amounts (parts by mass) shown in Table 2 are values converted into a solid content.

TABLE 2

| No. | MIXED SOLUTION No. | TYPE OF FLUOROCARBON RESIN | FLUOROCARBON RESIN ADDED AMOUNT (PART BY MASS) | HEATING TEMPERATURE × TIME (° C. × SECOND) | NOTE |
|---|---|---|---|---|---|
| 1 | 1 | COPOLYMER 1 | 2 | 320° C. × 20 | INVENTION EXAMPLE |
| 2 | 1 | COPOLYMER 2 | 4 | 280° C. × 30 | INVENTION EXAMPLE |
| 3 | 2 | COPOLYMER 3 | 8 | 280° C. × 20 | INVENTION EXAMPLE |
| 4 | 2 | COPOLYMER 2 | 4 | 330° C. × 15 | INVENTION EXAMPLE |
| 5 | 3 | COPOLYMER 2 | 0.8 | 260° C. × 40 | INVENTION EXAMPLE |
| 6 | 4 | COPOLYMER 2 | 6 | 330° C. × 35 | INVENTION EXAMPLE |

TABLE 2-continued

| No. | MIXED SOLUTION No. | TYPE OF FLUOROCARBON RESIN | FLUOROCARBON RESIN ADDED AMOUNT (PART BY MASS) | HEATING TEMPERATURE × TIME (° C. × SECOND) | NOTE |
|---|---|---|---|---|---|
| 7 | 5 | COPOLYMER 2 | 1 | 200° C. × 40 | INVENTION EXAMPLE |
| 8 | 5 | COPOLYMER 2 | 6 | 280° C. × 30 | INVENTION EXAMPLE |
| 9 | 6 | COPOLYMER 2 | 3 | 350° C. × 20 | INVENTION EXAMPLE |
| 10 | 1 | FLUOROCARBON RESIN 1 | 4 | 200° C. × 40 | COMPARATIVE EXAMPLE |
| 11 | 1 | FLUOROCARBON RESIN 2 | 4 | 280° C. × 30 | COMPARATIVE EXAMPLE |
| 12 | 7 | COPOLYMER 4 | 2 | 300° C. × 15 | COMPARATIVE EXAMPLE |
| 13 | 8 | COPOLYMER 4 | 2 | 280° C. × 40 | COMPARATIVE EXAMPLE |
| 14 | 9 | COPOLYMER 2 | 4 | 330° C. × 20 | COMPARATIVE EXAMPLE |
| 15 | 10 | COPOLYMER 3 | 6 | 400° C. × 5 | COMPARATIVE EXAMPLE |
| 16 | 11 | COPOLYMER 2 | 4 | 260° C. × 20 | COMPARATIVE EXAMPLE |
| 17 | 12 | COPOLYMER 2 | 6 | 330° C. × 40 | COMPARATIVE EXAMPLE |
| 18 | 13 | COPOLYMER 2 | 4 | 260° C. × 35 | COMPARATIVE EXAMPLE |
| 19 | 14 | COPOLYMER 3 | 2 | 300° C. × 20 | COMPARATIVE EXAMPLE |
| 20 | 1 | NONE | | 320° C. × 20 | COMPARATIVE EXAMPLE |
| 21 | 2 | COPOLYMER 1 | 0.2 | 200° C. × 25 | COMPARATIVE EXAMPLE |
| 22 | 2 | COPOLYMER 1 | 14 | 180° C. × 70 | COMPARATIVE EXAMPLE |
| 23 | 3 | FLUOROCARBON RESIN 3 | 20 | 280° C. × 30 | COMPARATIVE EXAMPLE |
| 24 | 5 | COPOLYMER 2 | 0.4 | 250° C. × 50 | COMPARATIVE EXAMPLE |
| 25 | 5 | COPOLYMER 2 | 12 | 250° C. × 20 | COMPARATIVE EXAMPLE |
| 26 | 15 | NONE | | 330° C. × 30 | REFERENCE EXAMPLE |

The copolymer 1 shown in Table 2 is one obtained by copolymerizing tetrafluoroethylene and straight-chain alkyl vinyl ether with a carbon number of 6, and the copolymer 2 is one obtained by copolymerizing tetrafluoroethylene and methyl vinyl ether. The copolymer 3 is one obtained by copolymerizing chlorotrifluoroethylene, propylene alkyl vinyl ether, and hydroxyhexyl vinyl ether and then substituting a hydroxyl group with a carboxyl group. The copolymer 4 is one obtained by copolymerizing each of chlorotrifluoroethylene and hydroxydodecyl vinyl ether by an already-known method. As the already-known method of copolymerization, for example, the method disclosed in Japanese Patent No. 3117511 is suitable, and further as the method of substituting a hydroxyl group with a carboxyl group, the method disclosed in Japanese Examined Patent Application Publication No. 58-136605 can be used. The fluorocarbon resin 1 is polytetrafluoroethylene, and the fluorocarbon resin 2 is polyvinylidene fluoride. Further, the fluorocarbon resin 3 is perfluoro alkoxy alkane.

A roll coater method was used for applying the treatment solutions, and a roll reduction amount and so on were adjusted so that the film thickness of the insulating coating film might become about 0.8 μm. The drying was performed by using a radiation furnace, and furnace temperature setting was adjusted so that the predetermined heating conditions shown in Table 2 could be obtained. Ultimate sheet temperatures and baking times differ depending on samples, but a heating temperature was adjusted to fall within a range of 180° C. to 400° C. and the baking time was adjusted to be 5 seconds to 70 seconds.

On the other hand, the average particle size was measured beforehand. The organic resin emulsion was diluted with distilled water, and a fluorocarbon resin powder was dispersed in distilled water for about one minute by an ultrasonic cleaner, and then a number average particle size was measured with a commercially available particle size measuring device using a laser diffractometry based on a JIS method (JIS Z8826).

Hereinafter, a method of evaluating manufactured samples No. 1 to No. 26 will be explained in detail.

With regard to the insulation performance, based on interlayer resistance measured based on a JIS method (JIS C2550), the interlayer resistance of lower than 5 Ω·cm$^2$/piece was evaluated as X, the interlayer resistance of 5 Ω·cm$^2$/piece to 10 Ω·cm$^2$/piece was evaluated as Δ. Then, the interlayer resistance of 10 Ω·cm$^2$/piece to 50 Ω·cm$^2$/piece was evaluated as ◯, and the interlayer resistance of 50 Ω·cm$^2$/piece or more was evaluated as ⊚.

With regard to the adhesiveness, the samples with an adhesive tape put thereon were wrapped around metal bars having a diameter of 10 mm, 20 mm, 30 mm, and then the adhesive tape was peeled off, and the adhesiveness was evaluated from the peeled state. One that did not peel even when being bent with 10 mm φ was evaluated as 10 mmφ OK, and hereinafter, one that did not peel with 20 mmφ was evaluated as 20 mm φ OK, one that did not peel with 30 mmφ was evaluated as 30 mmφ OK, and one that peeled off was evaluated as OUT.

With regard to the corrosion resistance under the wet environment, first, a 5% NaCl aqueous solution was designed to fall down onto the samples naturally for one hour in an atmosphere at 35° C. based on a salt spray test of a JIS method (JIS Z2371). Next, the samples were maintained for three hours at a temperature of 60° C. and a humidity of 40%, and were maintained for three hours at a temperature of 40° C. and a humidity of 95%, and this was set as one cycle and was performed repeatedly for five cycles. Then, a rusted area of each of the samples was evaluated by 10 points. Criteria of evaluation are as follows.
10: No rust occurred
9: A quite small amount of rust occurrence (0.1% or less in area ratio)
8: Area ratio of rust occurred=larger than 0.1% and 0.25% or less
7: Area ratio of rust occurred=larger than 0.25% and 0.50% or less
6: Area ratio of rust occurred=larger than 0.50% and 1% or less
5: Area ratio of rust occurred=larger than 1% and 2.5% or less
4: Area ratio of rust occurred=larger than 2.5% and 5% or less
3: Area ratio of rust occurred=larger than 5% and 10% or less
2: Area ratio of rust occurred=larger than 10% and 25% or less
1: Area ratio of rust occurred=larger than 25% and 50% or less A contact angle was measured by using a contact angle meter PG-X manufactured by MATSUBO Corporation. A measurement value is an average value obtained by the measurement being performed 10 times.

With regard to the appearance, one being glossy, smooth, and even was evaluated as 5, and hereinafter, one being glossy but slightly poor in evenness was evaluated as 4, one being slightly glossy and smooth but poor in evenness was evaluated as 3, one having low gloss, being slightly poor in smoothness and poor in evenness was evaluated as 2, and one being poor in all of gloss, evenness, and smoothness was evaluated as 1.

with regard to the heat resistance, after stress relief annealing at 750° C. for two hours in a nitrogen atmosphere being performed, a 2 mm×30 mm gauze was rubbed on the surface of the steel sheet with a load of 100 gf (about 0.98 N), and a peeled state of the insulating coating film was evaluated. As a result, one that did not peel was evaluated as 5, one that slightly peeled was evaluated as 4, one that clearly peeled off was evaluated as 3, one having a severe peeled state was evaluated as 2, and one that peeled off even without being rubbed with the gauze was evaluated as 1. These evaluation results are shown in Table 3.

TABLE 3

| No. | CORROSION RESISTANCE UNDER WET ENVIRONMENT | INSULATION PERFORMANCE | ADHESIVENESS | CONTACT ANGLE | APPEARANCE | HEAT RESISTANCE | NOTE |
|---|---|---|---|---|---|---|---|
| 1 | 10 | ◯ | 20 mm φ OK | 84° | 5 | 5 | INVENTION EXAMPLE |
| 2 | 10 | ◉ | 20 mm φ OK | 76° | 5 | 4 | INVENTION EXAMPLE |
| 3 | 8 | ◉ | 20 mm φ OK | 72° | 4 | 5 | INVENTION EXAMPLE |
| 4 | 9 | ◯ | 20 mm φ OK | 81° | 5 | 4 | INVENTION EXAMPLE |
| 5 | 8 | ◯ | 20 mm φ OK | 74° | 4 | 4 | INVENTION EXAMPLE |
| 6 | 10 | ◉ | 20 mm φ OK | 89° | 5 | 4 | INVENTION EXAMPLE |
| 7 | 8 | ◉ | 20 mm φ OK | 82° | 5 | 4 | INVENTION EXAMPLE |
| 8 | 7 | ◯ | 20 mm φ OK | 71° | 4 | 4 | INVENTION EXAMPLE |
| 9 | 7 | ◯ | 20 mm φ OK | 72° | 4 | 4 | INVENTION EXAMPLE |
| 10 | 3 | ◯ | 30 mm φ OUT | 71° | 4 | 4 | COMPARATIVE EXAMPLE |
| 11 | 3 | ◉ | 30 mm φ OUT | 68° | 4 | 2 | COMPARATIVE EXAMPLE |
| 12 | 2 | ◉ | 30 mm φ OK | 64° | 4 | 2 | COMPARATIVE EXAMPLE |
| 13 | 6 | Δ | 30 mm φ OK | 69° | 3 | 4 | COMPARATIVE EXAMPLE |
| 14 | 2 | ◯ | 30 mm φ OK | 66° | 4 | 4 | COMPARATIVE EXAMPLE |
| 15 | 8 | ◯ | 30 mm φ OUT | 64° | 1 | 1 | COMPARATIVE EXAMPLE |
| 16 | 4 | Δ | 30 mm φ OK | 74° | 3 | 2 | COMPARATIVE EXAMPLE |
| 17 | 3 | ◉ | 30 mm φ OUT | 61° | 1 | 2 | COMPARATIVE EXAMPLE |
| 18 | 4 | ◉ | 30 mm φ OUT | 72° | 1 | 2 | COMPARATIVE EXAMPLE |

TABLE 3-continued

| No. | CORROSION RESISTANCE UNDER WET ENVIRONMENT | INSULATION PERFORMANCE | ADHESIVENESS | CONTACT ANGLE | APPEARANCE | HEAT RESISTANCE | NOTE |
|---|---|---|---|---|---|---|---|
| 19 | 2 | ○ | 30 mm φ OK | 68° | 2 | 4 | COMPARATIVE EXAMPLE |
| 20 | 2 | ○ | 20 mm φ OK | 65° | 5 | 5 | COMPARATIVE EXAMPLE |
| 21 | 3 | Δ | 30 mm φ OK | 57° | 2 | 2 | COMPARATIVE EXAMPLE |
| 22 | 6 | ○ | 30 mm φ OUT | 66° | 1 | 4 | COMPARATIVE EXAMPLE |
| 23 | 5 | ○ | 30 mm φ OUT | 68° | 3 | 4 | COMPARATIVE EXAMPLE |
| 24 | 3 | Δ | 30 mm φ OK | 54° | 3 | 2 | COMPARATIVE EXAMPLE |
| 25 | 7 | ○ | 20 mm φ OK | 68° | 1 | 5 | COMPARATIVE EXAMPLE |
| 26 | 8 | ○ | 30 mm φ OK | 79° | 5 | 5 | REFERENCE EXAMPLE |

As shown in Table 3, it turned out that the samples No. 1 to No. 9 corresponding to the examples of the present invention are all excellent in the corrosion resistance under the wet environment. Further, it was found that the samples No. 1 to No. 9 are excellent not only in the corrosion resistance but also in the insulation performance, adhesiveness, and appearance. Further, in many of the samples No. 10 to No. 25 corresponding to comparative examples, the effect for the corrosion resistance was low, and further ones excellent in all of the corrosion resistance, insulation performance, adhesiveness, and appearance did not exist.

As has been explained above, in the electrical steel sheet according to the embodiment of the present invention, in manufacturing a laminated iron core, the corrosion resistance under the wet environment is good, and other properties related to the insulating coating film of the electrical steel sheet are also good.

In the foregoing, the suitable embodiment of the present invention has been explained in detail, but the present invention is not limited to such an example. It is clear that any person having common knowledge in the art to which the present invention pertains will be able to contrive various examples of changes and modifications within the category of the technical idea of the present invention, and it is understood that they also naturally belong to the technical scope of the present invention.

INDUSTRIAL APPLICABILITY

According to the present invention, it is possible to use an electrical steel sheet having good corrosion resistance under a wet environment and having excellent properties such as adhesiveness, a space factor, and a punching property as an iron core material of an electric apparatus and the like.

The invention claimed is:

1. An electrical steel sheet having a surface thereof coated with an insulating coating film obtained by mixing:
100 parts by mass of a mixture comprising 100 parts by mass of a metal phosphate and 1 part by mass to 50 parts by mass of an organic resin made of a mixture or copolymer of one type or two or more types selected from the group consisting of an acryl-based resin, an epoxy-based resin, and a polyester-based resin that have an average particle size of 0.05 μm to 0.50 μm, and
1 part by mass to 6 parts by mass of a copolymer consisting of a fluoroolefin and an ethylenically unsaturated compound as a solid content,
wherein the ethylenically unsaturated compound has a functional group which is not a fluoro group or is not a functional group having fluorine atoms,
wherein the copolymer of the fluoroolefin and the ethylenically unsaturated compound has a particle size of 0.05 μm to 0.50 μm,
wherein the ethylenically unsaturated compound is obtained by introducing the functional group into a monomer selected from styrene, vinyl acetate, polypropylene glycol acrylate, methoxy polyethylene methacrylate, vinyl alkyl ether, vinyl alkylene ether, isoprene, or acrylonitrile, or into an oligomer or low-molecular weight polymer obtained from styrene, vinyl acetate, polypropylene glycol acrylate, methoxy polyethylene methacrylate, vinyl alkyl ether, vinyl alkylene ether, isoprene, or acrylonitrile,
wherein the functional group is one or more selected from the group consisting of an alkyl group, a hydroxyl substituted alkylene group, a phenyl group, a benzyl group, a cyclic aliphatic group, an acetyl group, a carboxyl group, a hydroxyl group, an epoxy group, and an amino group,
wherein the fluoroolefin is one or more selected from the group consisting of a tetrafluoroethylene, a trifluoroethylene, a hexafluoropropylene, a vinylidene fluoride, a vinyl fluoride, and a trichlorofluoroethylene,
wherein the copolymer of the fluoroolefin and the ethylenically unsaturated compound is dispersed in the insulating coating film, and the dispersed copolymer is concentrated in the vicinity of a surface layer of the insulating coating film, and
wherein the metal phosphate is one or more phosphates selected from the group consisting of Li, Al, Mg, Ca, Sr, Ti, Ni, Mn and Co phosphates.

* * * * *